United States Patent [19]
Chang

[11] Patent Number: 5,543,851
[45] Date of Patent: Aug. 6, 1996

[54] METHOD AND APPARATUS FOR TRANSLATING CLOSED CAPTION DATA

[76] Inventor: Wen F. Chang, 19724 Elisa Ave, Saratoga, Calif. 95070

[21] Appl. No.: 403,203

[22] Filed: Mar. 13, 1995

[51] Int. Cl.$^6$ .......................... H04N 7/025; H04N 7/087
[52] U.S. Cl. ............................................ 348/468; 348/552
[58] Field of Search .................................... 348/468, 476, 348/552, 472, 478, 563; H04N 5/087, 5/025

[56] References Cited

U.S. PATENT DOCUMENTS

| | | | |
|---|---|---|---|
| 4,698,677 | 10/1987 | Kinghorn. | |
| 4,739,402 | 1/1988 | Maeda et al. | 348/468 |
| 4,894,789 | 1/1990 | Yee | 348/552 |
| 4,933,764 | 6/1990 | Kinghorn | 348/460 |
| 5,111,246 | 5/1992 | Duffield et al. | 348/552 |
| 5,262,860 | 11/1993 | Fitzpatrick et al. | 348/476 |
| 5,315,386 | 5/1994 | Muramoto | 348/569 |

OTHER PUBLICATIONS

Draft Standard EIA–608—"Recommended Practice for Line 21 Data Service", Jun. 17, 1993.

*Primary Examiner*—Victor R. Kostak
*Attorney, Agent, or Firm*—Edward B. Weller; Fenwick & West LLP

[57] ABSTRACT

A closed caption processing system processes a television signal having caption data therein. A detector receives the television signal. A decoder coupled to the detector receives the television signal, and removes the caption data from the signal to form a stripped video signal and a caption data signal. The stripped video signal is provided to a television. The closed caption data is displayed as text on a screen. A microcontroller receives the caption data from the decoder and provides the caption text to the screen. The caption text is updated unless the microcontroller receives a user selected command for freezing the displayed text. The user enters user selected commands for selecting a portion of the displayed text. A memory stores a dictionary that includes either definitions or translations of text or both. The microcontroller retrieves either the definition or translation of a selected portion of the text responsive to a user request, and then displays the definition or translation.

13 Claims, 11 Drawing Sheets

METHOD AND APPARATUS FOR TRANSLATING CLOSED CAPTION DATA

FIELD OF THE INVENTION

This invention relates to transmitting closed caption data with television signals, and more particularly to processing the closed caption data.

BACKGROUND OF THE INVENTION

Closed caption decoders decode closed caption data embedded in television signals and display in real time the closed caption text with the associated video image. The closed caption decoder may be a stand alone box or integral with a television. The caption text displayed on the screen of the television allows hearing-impaired persons to read the text of the audio while watching television.

Closed caption systems provide less benefit to persons having a limited vocabulary in the language of text, such as persons with English as a second language, because the displayed text may contain words that the viewer may not understand. Such persons using the closed caption system, upon the occurrence of an unknown word, may either skip the unknown word, or write down the word and look it up in a dictionary. For the latter approach, writing the word correctly after seeing the word a short time may be difficult. Also looking up the word in a dictionary is time consuming.

SUMMARY OF THE INVENTION

In the present invention, a method for processing closed caption data includes the step of receiving a television signal that includes closed caption data. The closed caption data is removed from the television signal to form a stripped video signal, which is provided to a television, and a closed caption text signal, which is provided to a screen other than the television.

A user command is received and a portion of the closed caption data is stored in response to the user command. The portion of the closed caption data is processed, such as defining the portion or translating the portion. In response to the user selected command, the updating of the displayed closed caption text on the screen is ceased. The closed caption data is continued to be removed from the television signal and the stripped video image is provided to the television.

An apparatus processes a television signal having caption data therein. A detector receives the television signal. A decoder coupled to the detector receives the television signal and provides the television signal to a television and provides the caption data to a display having a screen for displaying the caption data. A microcontroller coupled to the decoder receives the caption data, and provides the caption data to the display. The microcontroller receives user selected commands. The caption data provided to the display is not updated responsive to a first user selected command.

A memory stores definitions of text and provides a definition of selected displayed text responsive to a definition request. The microcontroller provides the definition request to the memory and receives the definition of the text from the memory, which is provided to the display. A memory stores translations of text responsive to a translation request. The microcontroller provides the translation request to the memory and receives the translation of selected displayed text from the memory, which is provided to the display.

DETAILED DESCRIPTION

Figure 1:
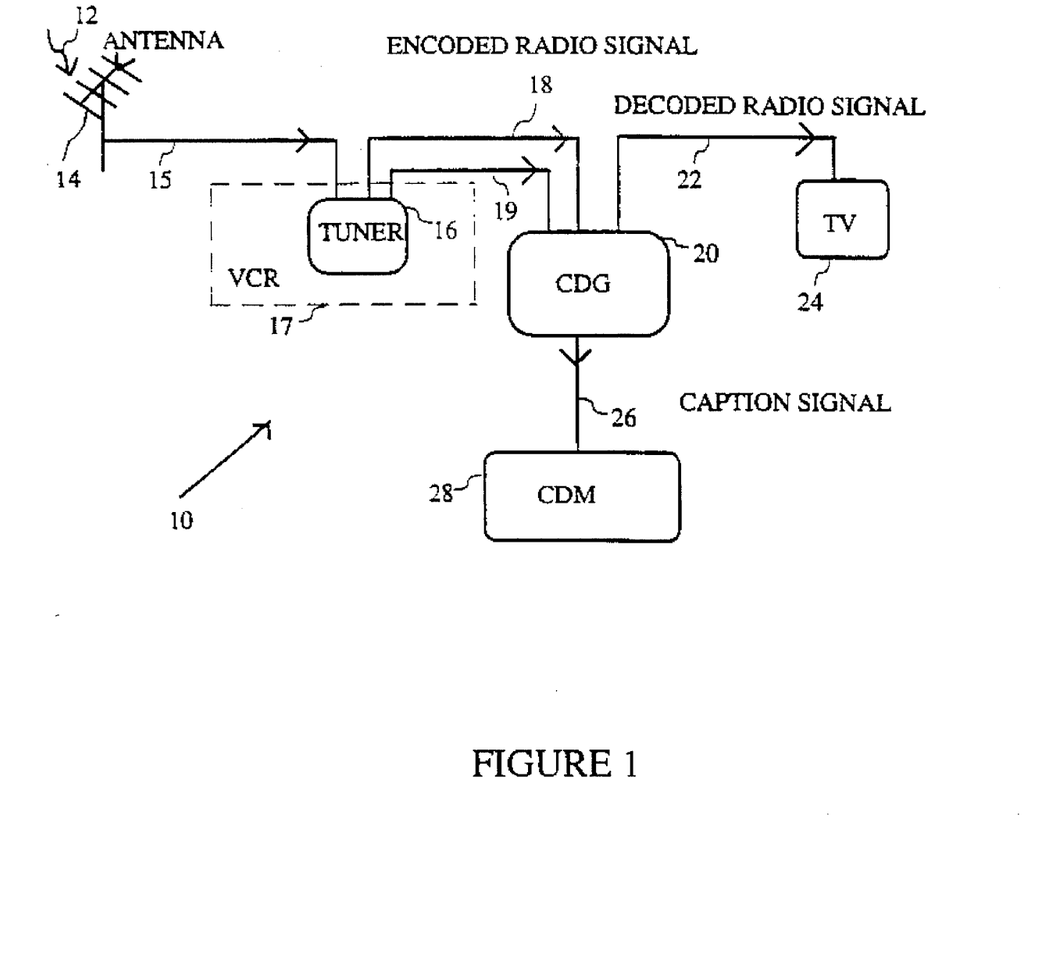
FIG. 1 is a block diagram illustrating a closed caption processing system in accordance with the present invention.

Referring to FIG. 1, there is shown a block diagram illustrating a closed caption processing system 10 in accordance with the present invention. A broadcaster (not shown) transmits a television signal 12 having an encoded radio signal modulated therein. The encoded radio signal contains a video signal, an audio signal, and encoded data, such as caption data. The caption data may be closed caption text which is program-related captions or service-related-text transmitted in real time with the video signal. In a National Television Standards Committee (NTSC) video signal, the closed caption text is typically encoded on line 21 of the television signal. The closed caption processing system 10 has a receiver 14 for receiving the television signal 12. The receiver 14 may be, for example, an antenna for receiving broadcast television signals, a coupler for receiving signals from a cable television system, or a satellite dish and down converter for receiving a satellite transmission and for downconverting the received signal from a microwave signal to a received television signal 15. The receiver 14 provides the received television signal 15 to a tuner 16 for selecting, in response to a user selected command, the channel of the received television signal and converting the signal into an encoded radio signal 18 at a predetermined frequency and into an audio signal 19. The predetermined frequency may be, for example, a seldom used channel such as channel 3 or a video signal. The tuner 16 may be incorporated into a video cassette recorder 17 (VCR) or a cable box, which may also descramble the television signal if necessary.

The tuner 16 provides the encoded radio signal 18 to a caption decoder and data generator 20 (CDG), which provides a decoded radio signal 22 to a conventional television 24 and provides a caption data signal 26 to a caption data manager (CDM) 28. The decoded radio signal 22 contains video, sliced caption text on lines of the video, and audio. The television 24 selectively may display or not display the caption text with the video. In other words, the caption decoder and data generator 20 may selectively strip or retain the closed caption text in the decoded radio signal 22. The communication link between the caption decoder and data generator 20 and the caption data manager 28 may be, for example, wireless, such as by infrared or RF.

The caption data manager 28 displays caption text without a video image on the same screen or window. The caption text may be displayed, for example, in an alphanumeric format. As described later herein, the user may manipulate the caption data without the associated video image, such as cease the scrolling or updating the displayed text, store the displayed text, define the displayed text, or translate the displayed text.

Figure 2:
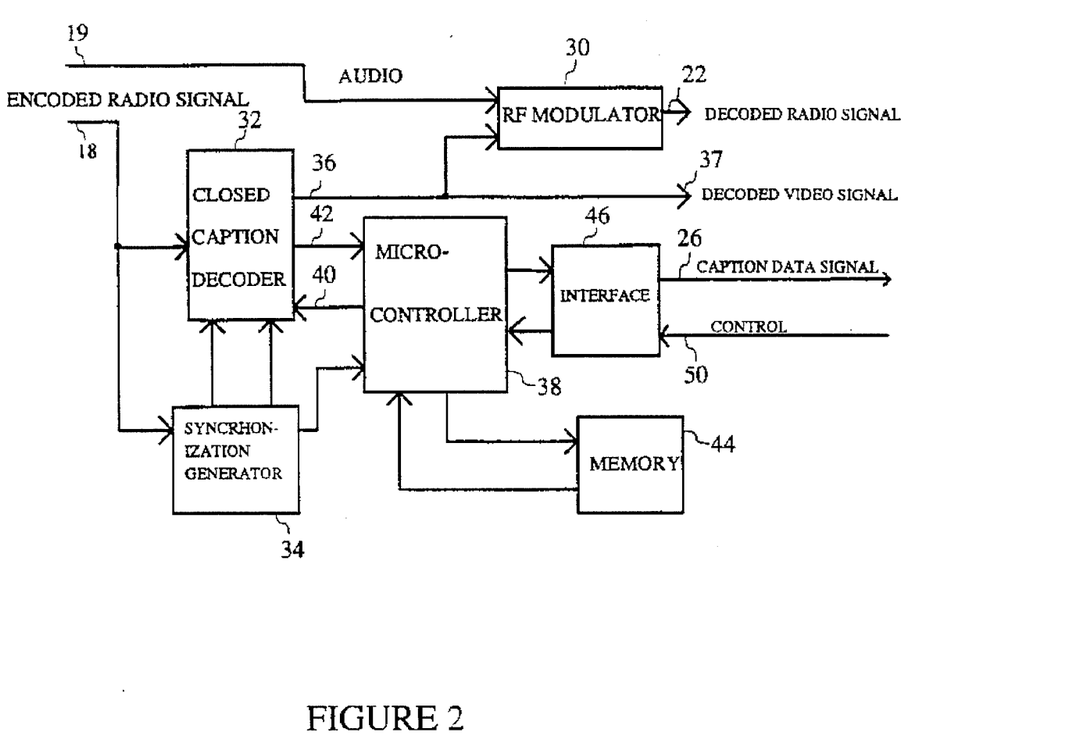
FIG. 2 is a block diagram illustrating a caption decoder and data generator of the closed caption processing system of FIG. 1.

Referring to FIG. 2, there is shown a block diagram of the caption decoder and data generator 20. The encoded radio signal 18 from the tuner 16 is provided to a closed caption decoder 32 and to a synchronization generator 34. The synchronization generator 34 provides a conventional vertical synchronization signal and a conventional horizontal synchronization signal to the closed caption decoder 32 for timing the processing of the encoded radio signal 18. The synchrohization generator 34 may be, for example, a model EL4583C manufactured by Elantec of Milpitas, Calif. The closed caption decoder 32 demodulates the encoded radio signal 18 to generate a decoded video signal 36 and provide the signal 36 to a radio frequency (RF) modulator 30 and to a terminal 37 for coupling to the television 24. The closed caption decoder 32 slices the encoded radio signal 18 to generate caption data 42. The RF modulator 30 generates the decoded radio signal 22 responsive to the audio signal 19 and the decoded video signal 36. The terminal 37 provides the decoded video signal 36 to the television 24 in systems in which the audio signal 19 is provided to a separate sound system or provided separately to a sound system integral with the television. For systems separately using the decoded video signal 36 and the audio signal 19, the RF modulator 30 may be omitted. The closed caption decoder 32 may be, for example, a model CCD3000 manufactured by ITI Semiconductors of Hoffman Estates, Ill. The RF modulator 30 may be, for example, a model RF-3406 manufactured by EPD Electronics of Gardena, Calif.

A microcontroller 38 having a central processing unit, a memory, an input/output (I/O) port, and other function units provides control signals 40 to the closed caption decoder 32 and receives the caption data 42 from the closed caption decoder 32. The microcontroller 38 may be, for example, a model 8751 manufactured by Philips Semiconductors of Sunnyvale, Calif. Alternatively, a separate central processing unit, memory, and I/O port may be used instead of a microcontroller. A memory 44 for storing caption data and parameters of software code is coupled to the microcontroller 38. The memory 44 may be, for example, a conventional static random access memory (SRAM).

An interface circuit 46 couples the microcontroller 38 to the closed caption manager 28 for communicating the caption data signal 26 and control signals 50. The communication channel between the interface circuit 46 and the caption data manager 28 may be, for example, an RS232 channel. For an RS232 channel, the interface circuit 46 may be, for example, a model MAX202 manufactured by Maxim of Sunnyvale, Calif.

Figure 3:
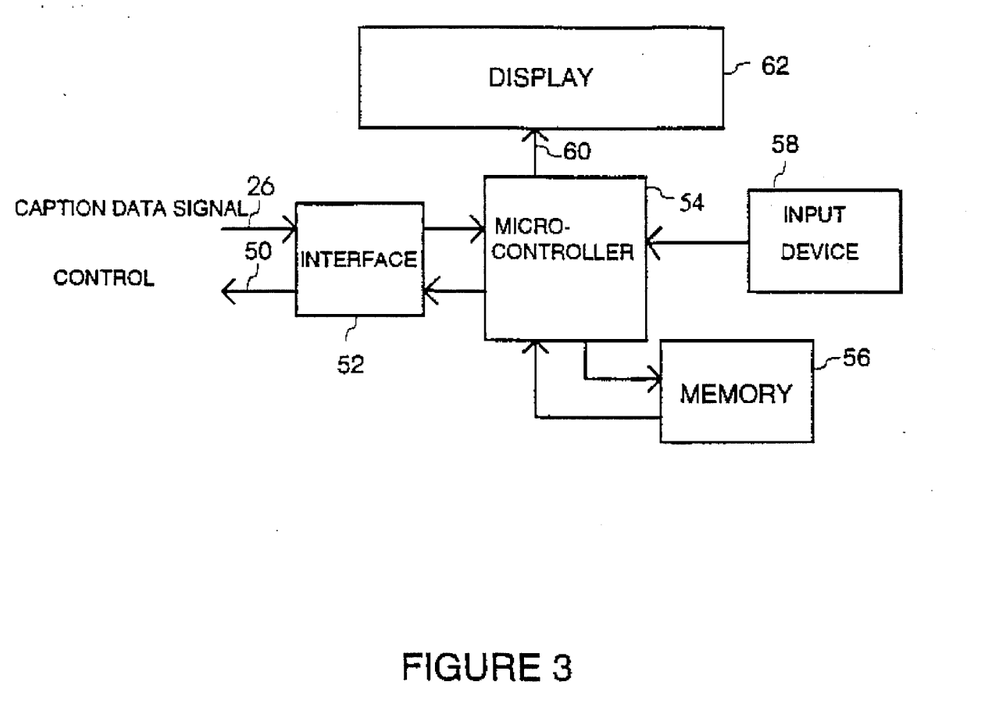
FIG. 3 is a block diagram illustrating a caption data manager of the closed caption processing system of FIG. 1.

Referring to FIG. 3, there is shown a block diagram illustrating a caption data manager 28. An interface circuit 52 couples the interface circuit 46 of the caption decoder and data generator 20 to a microcontroller 54 for receiving caption data 26 from and providing control signals 50 to the caption decoder and data generator 20. For an RS232 channel, the interface circuit 52 may be, for example, a model MAX202 manufactured by Maxim of Sunnyvale, Calif. Alternatively, a separate central processing unit, memory, and I/O port may be used instead of a microcontroller. The microcontroller 54 has a central processing unit, a memory, an I/O port, and other function units. The microcontroller 54 may be, for example, a model 8752 manufactured by Philips Semiconductor of Sunnyvale, Calif. A memory 56 coupled to the microcontroller 54 stores the caption data, a dictionary for defining words of the caption data, or a translation dictionary for translating words of the caption data from a first language into at least one second language. The dictionary may be in multiple languages. The memory 56 may include, for example, a conventional random access memory and a conventional read only memory.

An input device 58 receives data or commands from a user and provides same to the microcontroller 54. The input device 58 may be, for example, a keyboard or a voice recognition device. The microcontroller 54 provides a display signal 60 to a display 62. The display 62 may be, for example, a model HDM-40416H-5 liquid crystal display manufactured by Hantronix of Cupertino, Calif. The display signal 60 may include caption text, definitions of a portion of the caption text, and translations of a portion of the caption text.

The caption data manager 28 has a CDM select setting for establishing an operational mode of the microcontroller 54. A first operational mode is an automatic select mode in which the microcontroller 54 selects text having an identifier with a value greater than a preselected threshold value or level for processing, such as translating or defining. The identifier is a flag that represents the degree of difficulty of a word, phrase, information, or the like stored in the memory 56. The degree of difficulty may be, for example, a grade level rating of the word. A second operational mode is a manual select mode for selecting text for processing in response to user selected commands.

Figure 4:
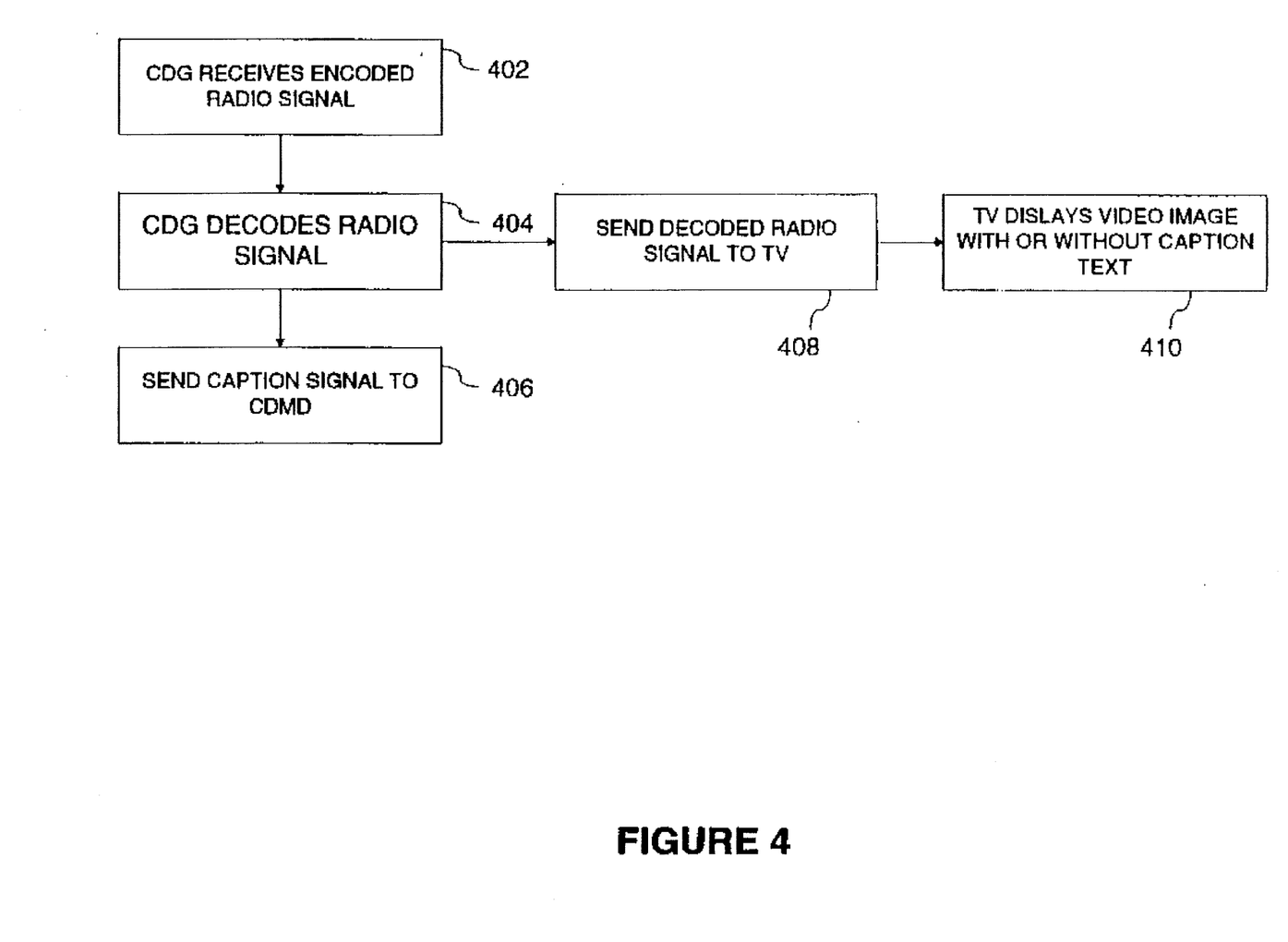
FIG. 4 is a flowchart illustrating the operation of the closed caption processing system of FIG. 1.

Referring to FIG. 4, there is shown a flowchart illustrating the operation of the closed caption processing system 10. The caption decoder and data generator 20 receives 402 and decodes 404 the encoded radio signal 18 and generates 404 the caption signal 26 and the decoded radio signal 22. The caption signal 26 is transmitted 406 to the caption data manager 28 for processing as described later herein in conjunction with FIGS. 5a and 5b. The decoded radio signal 22 is transmitted 408 to the television 24 for selectively displaying 410 the video images with the caption text or without the caption text.

Figure 5A:
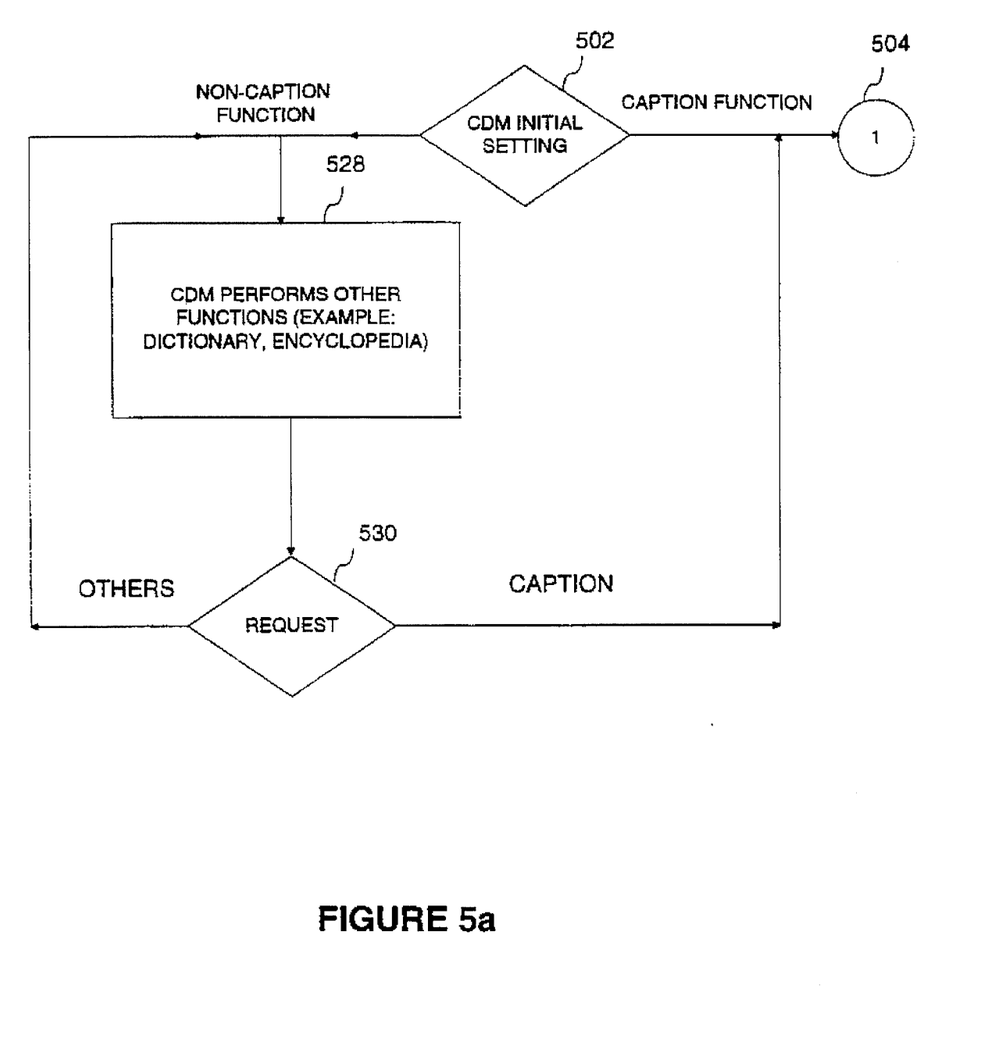
FIGS. 5a and 5b are flowcharts illustrating the operation of the caption data manager of FIG. 3.
Figure 5B:
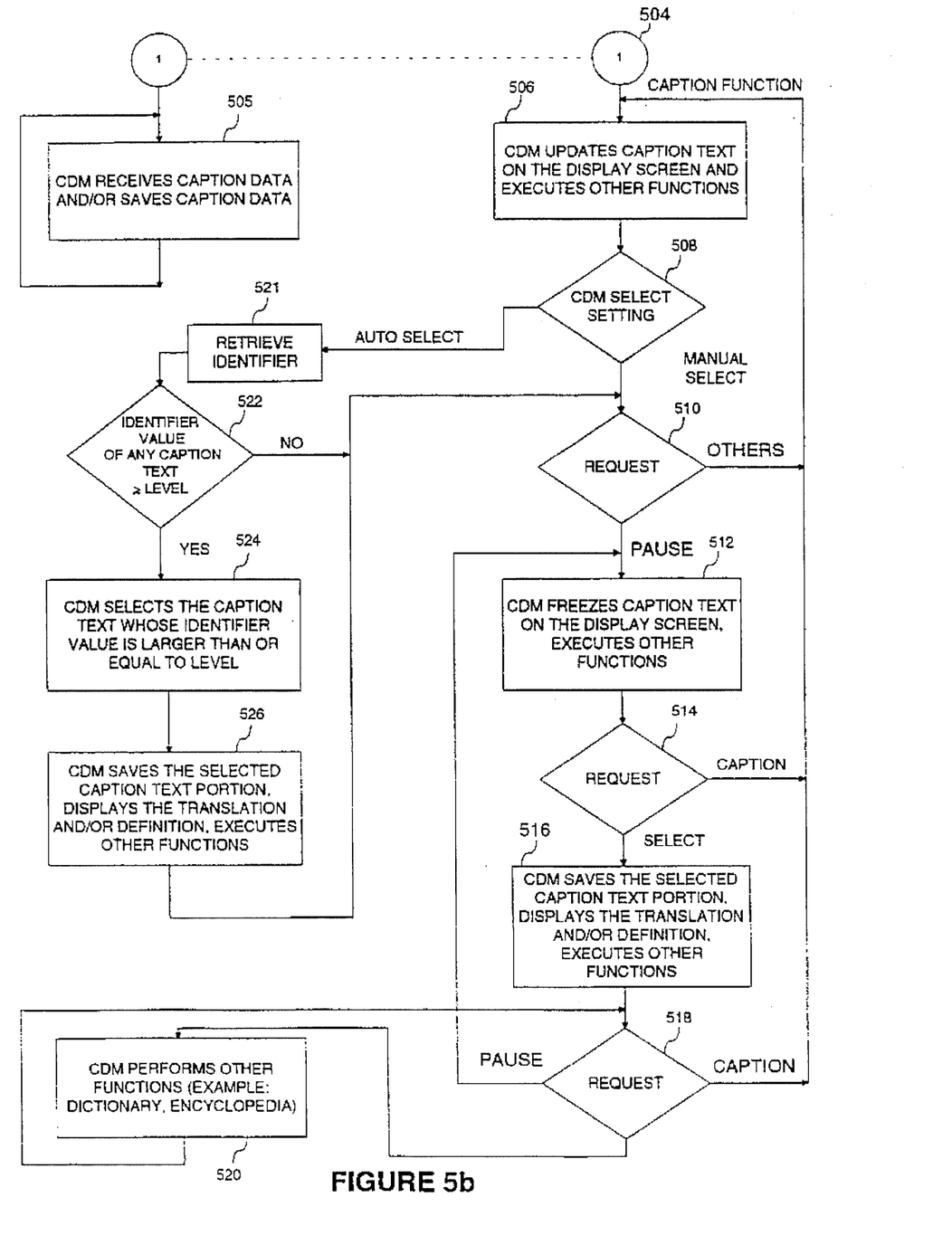
Figure 6A:
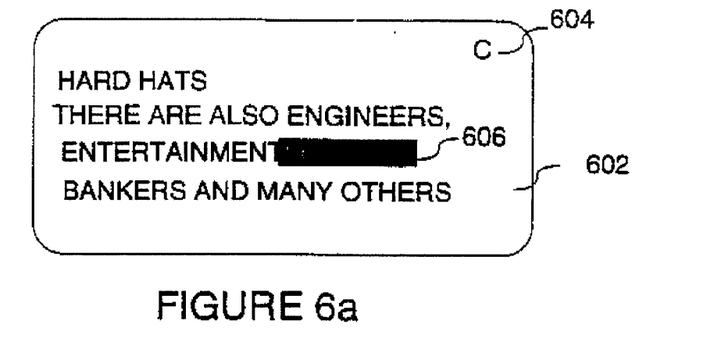
FIGS. 6a, 6b, 6c are schematic views illustrating the display screen of the caption data manager of FIG. 3.
Figure 6B:
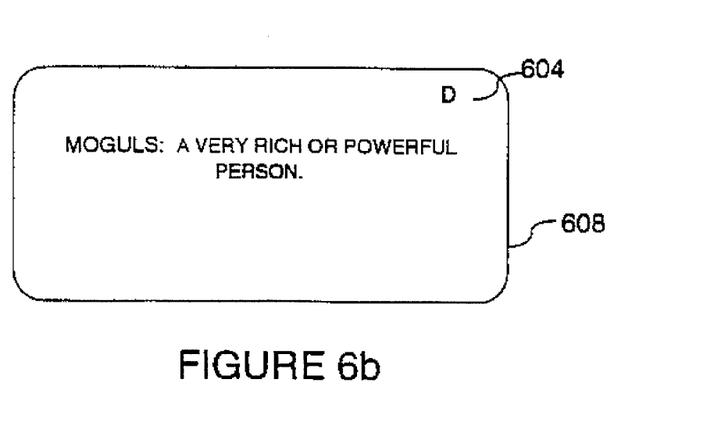
Figure 6C:
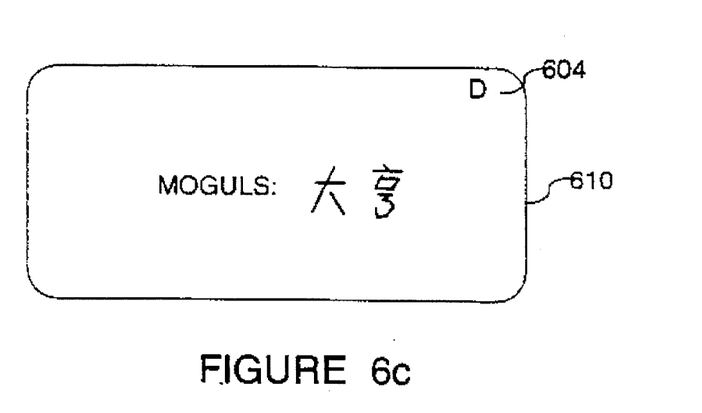

Referring to FIGS. 5a and 5b, there are shown flowcharts illustrating the operation of the caption data manager 28. Referring to FIGS. 6a, 6b, 6c, there are shown schematic views illustrating the display screen of the caption data manager 28. The caption data manager 28 has a default setting as either a caption function or non-caption function. This setting may be changed at any time through a user command from the input device 58. In the non-caption function, the caption data manager 28 receives input data from the input device 58. In the caption function, the caption data manager 28 processes data received from the caption decoder and data generator 20.

Referring now to FIG. 5a, the microcontroller 54 of the caption data manager 28 determines 502 the initial setting of the caption data manager 28. If the initial setting is a caption function, the microcontroller 54 performs 504 the caption function. Referring now to FIG. 5b, the microcontroller 54 receives 505 the caption data from the caption decoder and data generator 20 and stores the caption data in the memory 56. Concurrently, the microcontroller 54 provides 506 the caption data to the display 62 for updating the displayed text either in full screen or a window, without an associated video image or without overlapping the associated video image. An example of a full screen display 602 of caption text is shown in FIG. 6a. An indicator 604 indicates the nature of the displayed data. An indicator 604 having a value "C" indicates that the displayed data is caption text. An indicator 604 having a value "D" indicates that the displayed text is dictionary data, such as definitions (as shown in FIG. 6b) or translations (as shown in FIG. 6c).

The microcontroller 54 determines 508 whether the CDM select setting of the caption data manager 28 is in an automatic selection mode or a manual selection mode. If the CDM select setting is the manual selection mode, while displaying the caption text, the microcontroller 54 monitors 510 the input device 58 for a user selected command. If the user selected command is a command other than a pause command or if there is no user selected command, the microcontroller 54 returns to updating 506 the caption text on the display 62. If the microcontroller 54 is in an automatic mode but had responded to a user selected command in a soft manual mode, the microcontroller 54 returns to the automatic selection mode. If a pause command from the input device 58 is detected, the microcontroller 54 freezes 512 the caption text on the display 62 or window by ceasing the updating of displayed caption text. The microcontroller 54 continues to process 505 the caption data and execute other functions during the pause. If a caption command is received 514 from the input device 58, the microcontroller 54 returns to updating 506 the caption text on the display 62. If a select command is received 514, the microcontroller 54 saves 516 the selected caption text 606. Selected text 606 (FIG. 6a) may be indicated on the display 62 in a conventional manner, such as highlighted or displayed in reverse video. In response to a definition command, the microcontroller 54 retrieves from the memory 56 a definition of the selected text and displays such definition on the display 62 or window. An example of a definition display 608 is shown in FIG. 6b, which shows the definition of the selected word 606. In response to a translate command, the microcontroller 54 translates the selected caption text and displays the translation content on the display or window. An example of a translation display 610 is shown in FIG. 6c, which shows the translation of the selected word 606 into a second language, here Chinese.

The microcontroller 54 determines 518 the type of user selected command. In response to a caption command, the microcontroller 54 returns to updating 506 the caption text on the display 62. In response to a pause command, the microcontroller 54 freezes 512 the caption text and proceeds as described earlier herein. For other commands, the microcontroller 54 performs 520 the requested function. Such functions may be, for example, a dictionary or encyclopedia function. The microcontroller 54 returns to determining 518 the type of user selected command.

On the other hand, if the determination 508 is that the CDM select setting is the automatic selection mode, the microcontroller 54 retrieves 521 from the memory 56 the identifier value for each word in the caption text. The microcontroller 54 compares 522 the identifier with the preselected threshold level. If the identifier value of the caption text is less then the threshold level, the microcontroller 54 proceeds to determining 510 the request. Conversely, if the identifier value of the caption text is greater then the threshold level, the microcontroller 54 selects 524 such caption text and stores 526 the selected caption text in the memory 56. The microcontroller 54 displays the translation or definition of the selected text. The microcontroller 54 monitors 510 the input device 58 for a user command as described earlier herein.

Referring back to FIG. 5a, if the user command is a non caption function or if the default setting is a noncaption function 502, the microcontroller 54 performs 528 the selected or default function. For example, the microcontroller 54 may operate as a general purpose electronic system, such as an electronic dictionary or encyclopedia, for a non caption function. The microcontroller 54 continues to perform the non-caption function until a caption command is received 530. Responsive to the caption command, the microcontroller 54 executes 504 the caption function as described above.

Figure 7A:
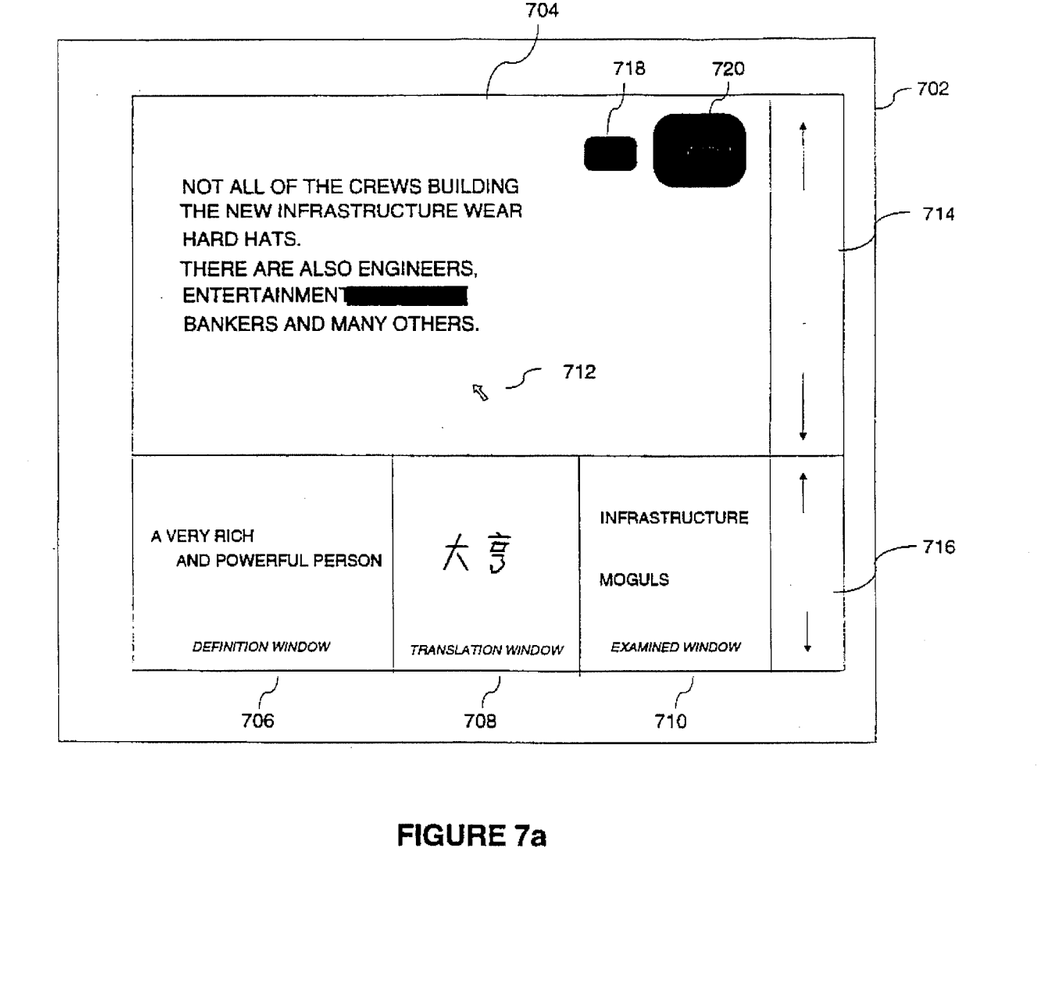
FIGS. 7a and 7b are schematic views illustrating display screens, in a window configuration, of the caption data manager of FIG. 3 in an alternate embodiment of the displays of FIGS. 6a, 6b, and 6c.
Figure 7B:
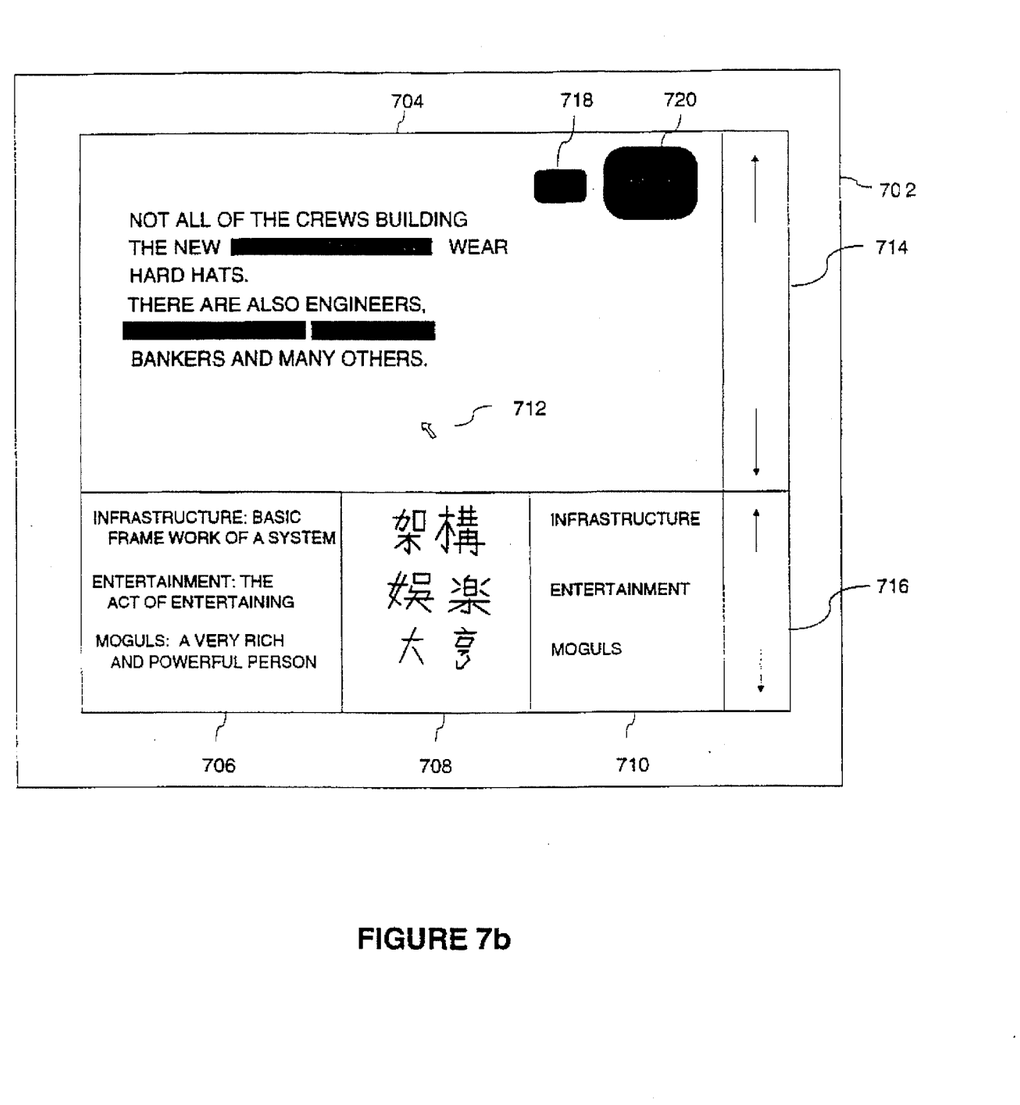

Referring to FIGS. 7a and 7b, there are shown schematic views illustrating the display screen in a window configuration of the caption data manager in an alternate embodiment of the display of FIGS. 6a, 6b, and 6c. For a display of sufficient size, the display 702 may be partitioned to show multiples windows. The display 702 is arranged in a caption text window 704, a definition window 706, a translation window 708, and an examined word window 710. The text in the caption text window 704 is frozen in response to a pause command. The user may select words for definition or translation by moving a cursor 712 and selecting text. For example, in the manual mode of FIG. 7a, the words "infrastructure" and "mogul" have been selected 516. In FIG. 7b, say the words "infrastructure" and "entertainment" have identifier values of 6 and 4, respsectively. For a preselected threshold level of 4 these words are selected 524 in the automatic selection mode and are saved 526 in the window 710. Say the word "mogul" has an identifier value of 3. The word "mogul" is not selected 524 in the automatic mode. The user may select 516 the word "mogul" which is then saved 516 in the window 710. The words may be defined 516 or translated 516 and the definition or translation displayed 516 in the respective window 706, 708. The windows may be scrolled using conventional scroll bars 714, 716. The definitions, the translations into a second language (here Chinese), and a list of each of these words are shown in the definition window 706, the translation window 708, and the examined word window 710, respectively. The indicator 718 shows the threshold level for the selection mode. A control display selection icon 720 allows the user to alter the characteristics of the display, such as font, size, and the like.

Figure 8:
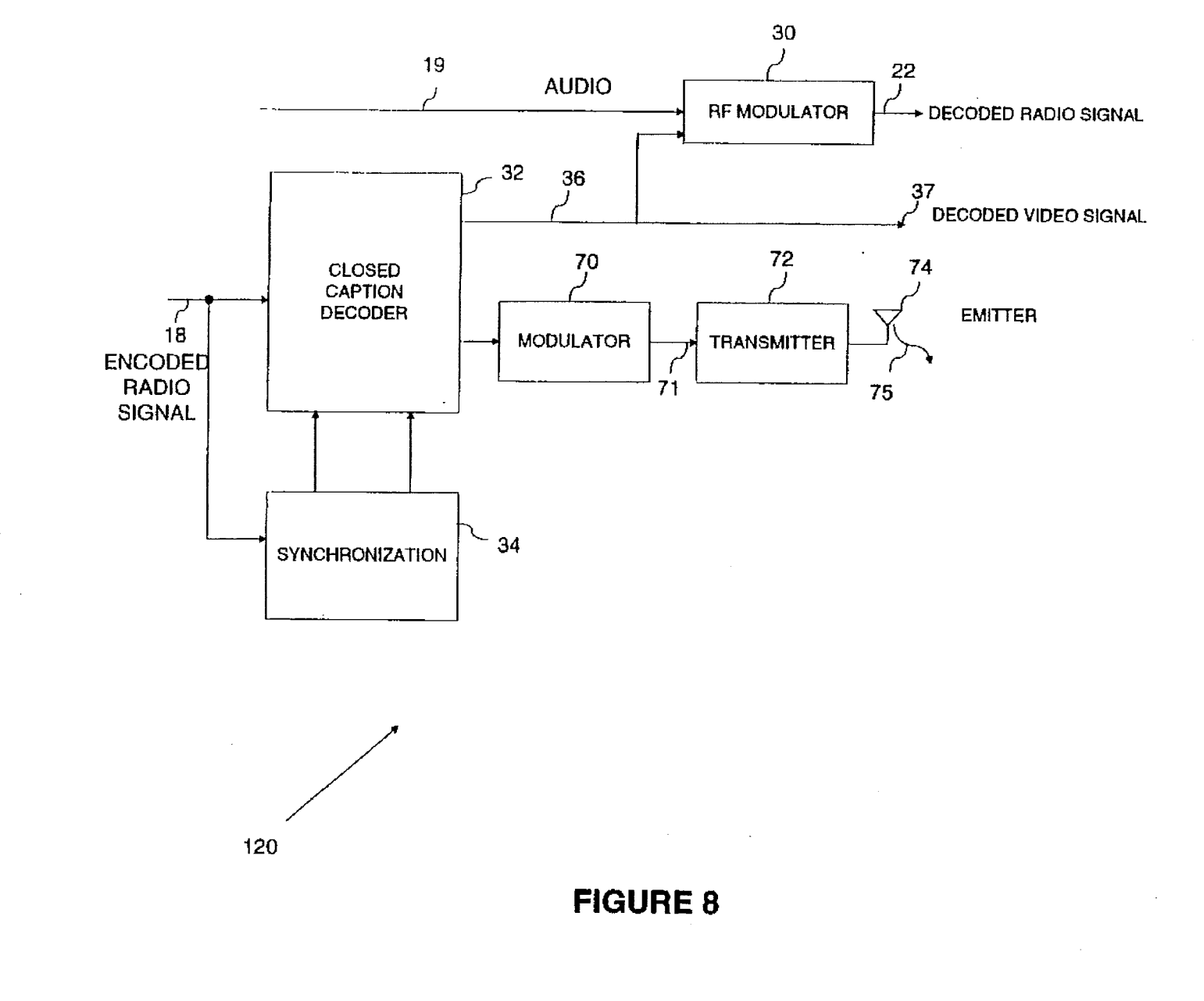
FIG. 8 is a block diagram illustrating a caption decoder and data generator in accordance with a second embodiment of the invention.

Referring to FIG. 8, there is shown a block diagram illustrating a caption decoder and data generator 120 in accordance with a second embodiment of the invention. Like elements of FIGS. 2 and 8 have like reference numerals. The RF modulator 30, the closed caption decoder 32, the synchronization generator 34, and the terminal 37 are arranged as in the caption decoder and data generator 20 of FIG. 2.

The closed caption decoder 32 provides the caption data to a modulator 70 which provides a modulating signal 71 to a transmitter 72 for modulating the data onto a carrier signal. The transmitter 72 provides the modulated carrier signal to an emitter 74 for transmitting the modulated carrier signal 75 to a caption data manager 128. The emitter 74 may be, for example, an antenna or an infrared light emitting diode. The modulated carrier signal may be, for example, a radio signal, an infrared signal, a light signal, and the like.

Figure 9:
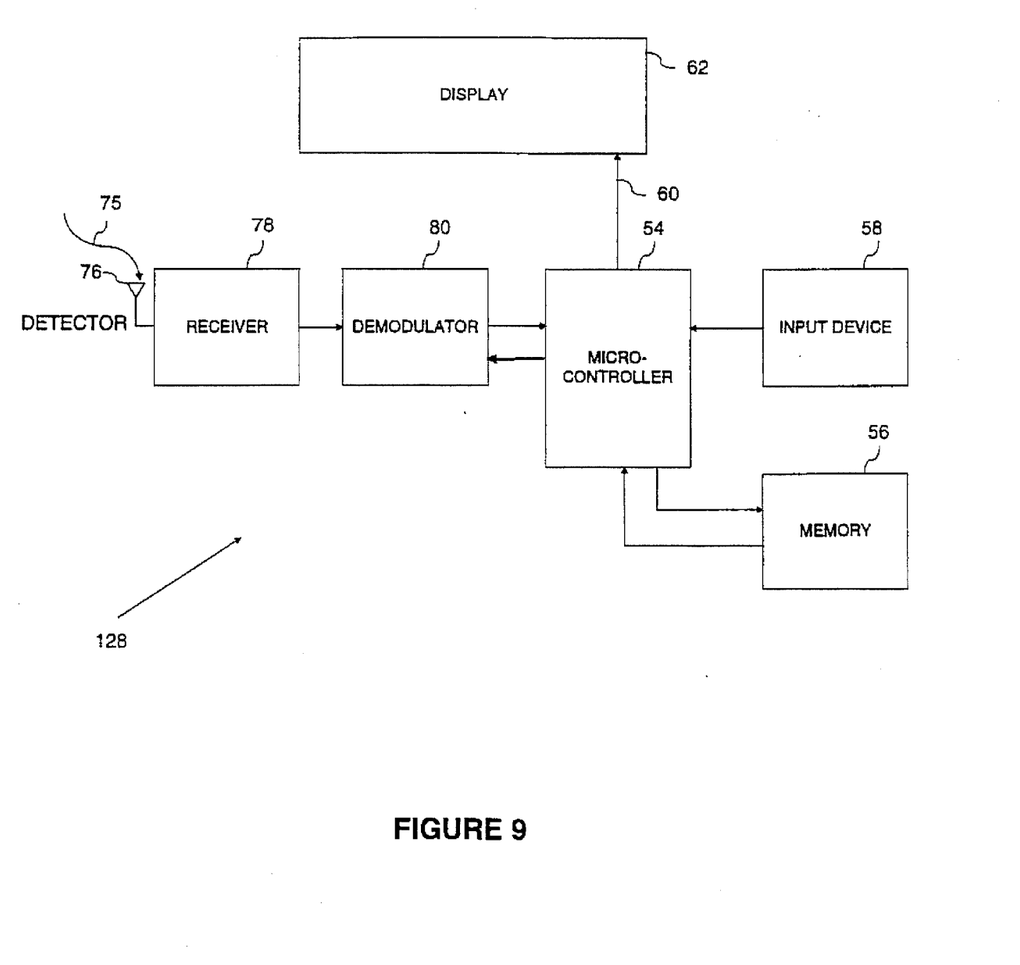
FIG. 9 is a block diagram illustrating a caption data manager in accordance with a second embodiment of the invention.

Referring to FIG. 9, there is shown a block diagram illustrating the caption data manager 128 in accordance with the second embodiment of the invention. Like elements of FIGS. 3 and 9 have like reference numbers. The microcontroller 54, the display 62, the input 13 input device 58, and the memory 56 are arranged as in the caption data manager 28 of FIG. 3.

A detector 76 receives the transmitted modulated carrier signal 75 and provides the received signal to a receiver 78 for signal amplification. The detector 76 may be, for example, an RF antenna or an infrared detector. The demodulator 80 demodulates the received carrier signal from the receiver 78 to recover the caption data. The demodulator 80 receives control signals from the microcontroller 54 for power consumption reduction control and data synchronization and provides the recovered caption text data to the microcontroller 54. The microcontroller 54 operates as described above.

In a third embodiment, the closed caption decoder 32 and the synchronization generator 34 are located after the demodulator 80. The tuner 16 provides the encoded radio signal 18 to the modulator 70 which is processed by the transmitter 72. The emitter 74 transmits the modulated encoded radio signal, for example as a video signal, to the detector 76. After processing in the receiver 78 and the demodulator 80, the encoded signal is provided to the closed caption decoder 32 which slices the caption data and provides the data to the microcontroller 54 for processing as described earlier herein.

I claim:

1. A method comprising the steps of:

receiving a television signal including caption data;

removing the caption data from the television signal to form a stripped video signal and a caption data signal;

providing the stripped video signal to a television; displaying the caption data; receiving a user command indicative of a portion of the caption data; and retrieving a dictionary record corresponding to said portion of the caption data.

2. The method of claim 1 wherein the step of retrieving a dictionary record includes the step of defining the portion of the caption data.

3. The method of claim 1 wherein the step of retrieving a dictionary record includes the step of translating the portion of the caption data.

4. An apparatus for processing a television signal having caption data therein, the apparatus comprising:

a detector for receiving the television signal;

a decoder having an input coupled to the detector for receiving the television signal, having a first output for providing the television signal to a television, and having a second output for providing caption data;

a display having an input for receiving caption text and having a screen for displaying the caption text;

a memory for storing a dictionary and having an output for providing a portion of the dictionary responsive to a dictionary request; and a central processing unit having a first input coupled to the output of the decoder for receiving the caption data, having a second input coupled to the output of the memory for receiving said portion of the dictionary, having a first output coupled to the input of the display for providing the caption text and for providing said portion of the dictionary, and having a second output coupled to the memory for providing the dictionary request in response to a user selected command.

5. The apparatus of claim 4 wherein the central processing unit has a third input for receiving at least one user selected command and the caption text provided to the display is not updated responsive to a second user selected command.

6. The apparatus of claim 4 wherein the memory stores, an identifier indicative of a level of difficulty for each of a plurality of text words and the central processing unit provides a portion of the dictionary corresponding to one of the plurality of text words if the identifier corresponding to the caption text word is greater than a user selected threshold.

7. The apparatus of claim 4 wherein the dictionary includes definitions of text and the dictionary request is a definition request.

8. The apparatus of claim 4 wherein the dictionary includes a translation dictionary and the dictionary request is a translation request.

9. An apparatus for processing caption text comprising:

a detector for receiving caption data separate from a television signal;

a display having an input for receiving caption text and having a screen for displaying the caption text;

a memory for storing a dictionary and having an output for providing a portion of the dictionary responsive to a dictionary request; and a central processing unit having a first input coupled to the output of the detector for receiving the caption data, having a second input for receiving user selected commands, having a third input coupled to the memory for receiving said portion of the dictionary, having a first output coupled to the input of the display for providing the caption text as received in a first operational mode and for providing the same text in a second operational mode responsive to a first user selected command and for providing said portion of the dictionary.

10. The apparatus of claim 9 wherein the memory stores, an identifier indicative of a level of difficulty for each of a plurality of text words and the central processing unit provides a portion of the dictionary corresponding to one of the plurality of text words if the identifier corresponding to the caption text word is greater than a user selected threshold.

11. The apparatus of claim 9 wherein the dictionary includes definitions of text and the dictionary request is a definition request.

12. The apparatus of claim 9 wherein the dictionary includes a translation dictionary and the dictionary request is a translation request.

13. A method comprising the steps of:

receiving a television signal including caption data;

removing the caption data from the television signal to form a stripped video signal and a caption data signal;

providing the stripped video signal to a television;

displaying the caption data;

retrieving an identifier indicative of a level of difficulty corresponding to the caption data; and retrieving a dictionary record corresponding to said caption data of the identifier exceeds a predetermined threshold.

* * * * *